United States Patent [19]

Weigl et al.

[11] Patent Number: 5,299,843
[45] Date of Patent: Apr. 5, 1994

[54] ANTI-TWIST COUPLING ASSEMBLY

[75] Inventors: Jeffrey L. Weigl, Northfield Center; Gerald A. Babuder, Mentor, both of Ohio

[73] Assignee: Cajon Company, Macedonia, Ohio

[21] Appl. No.: 721,933

[22] Filed: Jun. 27, 1991

Related U.S. Application Data

[63] Continuation of Ser. No. 468,691, Jan. 23, 1990, Pat. No. 5,066,051.

[51] Int. Cl.[5] .................................... F16L 35/00
[52] U.S. Cl. .................................... 285/328; 285/330; 285/353; 285/379
[58] Field of Search ............... 285/328, 330, 389, 354, 285/363, 379, 353

[56] References Cited

U.S. PATENT DOCUMENTS

| | | | |
|---|---|---|---|
| 593,381 | 11/1897 | Lau et al. | 285/328 X |
| 748,546 | 12/1903 | Vail | 285/353 X |
| 2,322,691 | 6/1943 | Hensel | 285/328 X |
| 2,500,720 | 3/1950 | van Der Heem | 285/328 X |
| 2,688,500 | 9/1954 | Scott | 285/328 X |
| 3,472,534 | 10/1969 | Stevens | 285/328 X |
| 5,054,822 | 10/1991 | McGushion | 285/328 X |
| 5,058,935 | 10/1991 | Eidsmore | 285/353 |
| 5,060,987 | 10/1991 | Miller | 285/328 |

FOREIGN PATENT DOCUMENTS

| | | | |
|---|---|---|---|
| 928694 | 12/1947 | France | 285/320 |
| 249001 | 3/1926 | United Kingdom | 285/328 |
| 588781 | 6/1947 | United Kingdom | 285/328 |

*Primary Examiner*—Randolph A. Reese
*Assistant Examiner*—Heather Chun
*Attorney, Agent, or Firm*—Fay, Sharpe, Beall, Fagan, Minnich & McKee

[57] ABSTRACT

A tube coupling comprises first and second coupling components having transversely extending sealing end faces in aligned face-to-face relationship. First and second nut members are arranged to drive the sealing end faces toward each other. An annular anti-twist member is located between the first nut means and the first coupling member for conducting axial forces from the first nut member to the first coupling component. The annular anti-twist member and the second nut member include axially engaged portions for preventing relative rotation therebetween.

29 Claims, 7 Drawing Sheets

FIG. 13

ANTI-TWIST COUPLING ASSEMBLY

BACKGROUND OF THE INVENTION

This application is a continuation application of U.S. application Ser. No. 468,691, filed Jan. 23, 1990, now U.S. Pat. No. 5,066,051.

The subject invention is directed toward the art of pipe joints and couplings, and, more particularly, to an improved tube coupling. The coupling of the invention is especially suited for use in ultra-high vacuum applications and will be described with particular reference thereto; however, as will become apparent, the invention is capable of broader application and could be used in other systems and under a variety of different pressure conditions.

U.S. Pat. No. 3,521,910 to Callahan, et. al. discloses a tube coupling which is in widespread use in both pressure and vacuum systems. However, it has achieved particular success in ultra-high vacuum applications.

The coupling disclosed in the noted patent is comprised of first and second coupling components having a generally annular configuration with an axial through passage and end faces perpendicular to the axis of the passages. Sealing surfaces are formed on the end faces and typically comprise an annular rib or protrusion which extends outwardly from the end face circumferentially of the passage. Generally, a flat, smooth metal gasket is positioned between the opposed end faces and threaded coupling nuts act to drive the coupling components together on opposite sides of the sealing gasket to produce a seal between the ribs and the gasket. During make-up of the coupling, it is desirable that there be no relative rotation or twisting between the cooperating coupling components and the sealing washer. Preferably, any relative motion should be suppressed or eliminated to avoid the possibility of scoring or galling of the end faces or the sealing washer. If such galling or scoring occurs, the effectiveness of the joint is significantly reduced and leaks can develop. Moreover, the ability to re-make the joint after disassembly can be lost.

In the prior art, it has been proposed that an anti-friction thrust bearing be installed between the coupling nut and the associated coupling component. The use of the anti-friction bearing tends to prevent the undesirable relative rotation by reducing torque transmission from the coupling nut to one or the other of the coupling components. Both standard and special ball and needle type thrust bearing assemblies have been used for this purpose. While this approach has been somewhat successful, it is not fully satisfactory in that it significantly increases the cost and complexity of the coupling assemblies. In addition, the use of the anti-friction thrust bearings increases the length and diameter of the coupling assemblies. Consequently, as can be seen, there exists an on-going need for a coupling design which can prevent relative rotary motion between the sealing faces of the coupling components and/or between the coupling components and the seal ring during fitting make-up.

BRIEF DESCRIPTION OF THE INVENTION

The subject invention provides a coupling design which provides a simple and efficient solution to the noted problem. In particular, and in accordance with an aspect of the invention, a coupling assembly of the general type described above is provided with anti-twist means constituting an annular member located between one of the coupling nuts and its associated coupling member for conducting axial forces from the nut member to the coupling component while preventing relative rotation or twisting between the coupling component and the other coupling nut member. Preferably, the annual anti-twist member and the second nut member include axially engaged portions which require that rotation of one of the two components be duplicated with simultaneous movement of the other. That is, both the annular member and the second nut member must rotate together if either rotates.

Because the components are constrained in the manner noted, all movements applied to the opposed coupling components during tightening of the coupling nut members are axially directed movements which drive the sealing faces toward one another without producing twisting or relative rotation therebetween.

In accordance with a more limited aspect of the invention, the axially engaged portions comprise axially extending, circumferentially spaced fingers or tabs formed on the second nut member and the annular member.

Preferably, in accordance with a still further aspect of the invention, biasing means act to maintain the annular member under a continual bias toward the second nut member. This assures positive engagement between the annular member and the second member throughout all phases of fitting make-up.

In accordance with a still more limited aspect of the invention, the biasing means comprises a spring positioned about the first coupling component and the annular member and acting against the first nut member.

As can be readily understood, the invention allows the desired results to be achieved without significantly increasing the overall length, diameter or complexity of the fitting design. Additionally, the design does not significantly increase the cost of the fitting and produces substantially total elimination of relative movement between the coupling components and the gasket member.

As can be seen from the foregoing, a primary object of the invention is the provision of a tube coupling of the type described wherein scoring and galling of the seal faces cannot take place during fitting make-up or disassembly.

Yet another object is the provision of a coupling of the type described wherein relative motion between the coupling components and the seal gaskets or seal faces is totally eliminated.

A still further object of the invention is the provision of a tube coupling wherein the transmission of torque and/or relative rotation between the coupling components is eliminated without significantly increasing the overall length and diameter of the coupling assembly.

Yet another object of the invention is the provision of a tube coupling wherein the diameter of the fitting is substantially less than those fittings which use internal bearings to prevent torque transmission and/or relative rotation.

BRIEF DESCRIPTION OF THE DRAWINGS

The above and other objects and advantages will become apparent from the following description when read in conjunction with the accompanying drawings wherein:

FIG. 12 is an exploded side elevation of a threaded male end connection and associated components of a further embodiment; and, FIG. 13 is a view taken on line 13—13 of FIG. 12.

DETAILED DESCRIPTION OF THE PREFERRED AND ALTERNATE EMBODIMENTS

Figure 1:
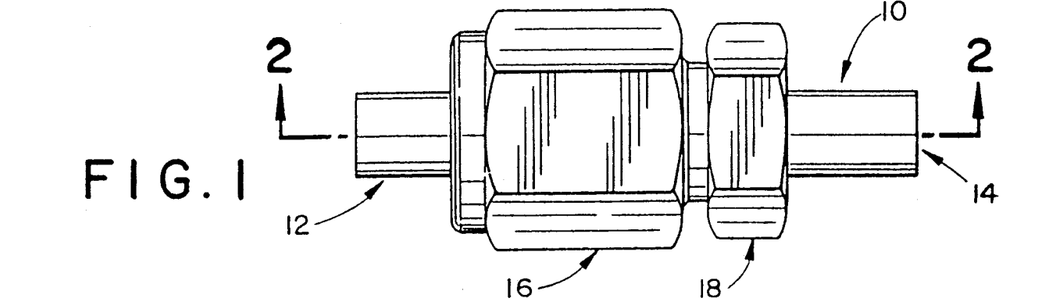
FIG. 1 is a side view of the coupling assembly formed in accordance with a preferred embodiment of the subject invention.
Figure 2:
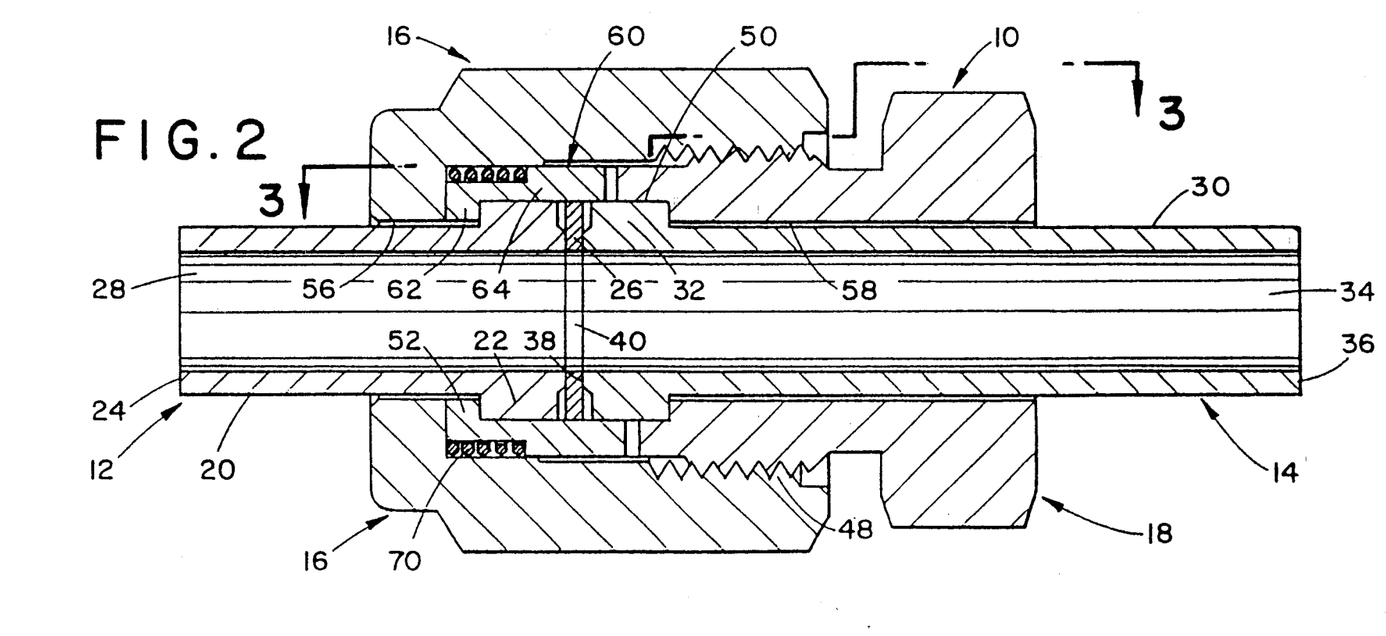
FIG. 2 is a partial cross-sectional taken on line 2—2 of FIG. 1 and showing the axial engagement between the annular member and the second coupling nut.
Figure 3:
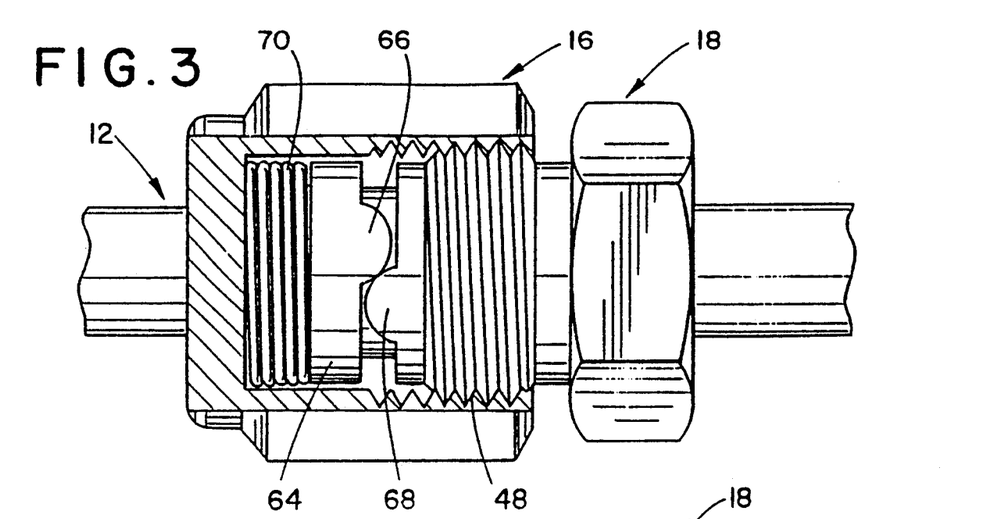
FIG. 3 is a partial cross-sectional view taken on line 3—3 of FIG. 2.
Figure 4:
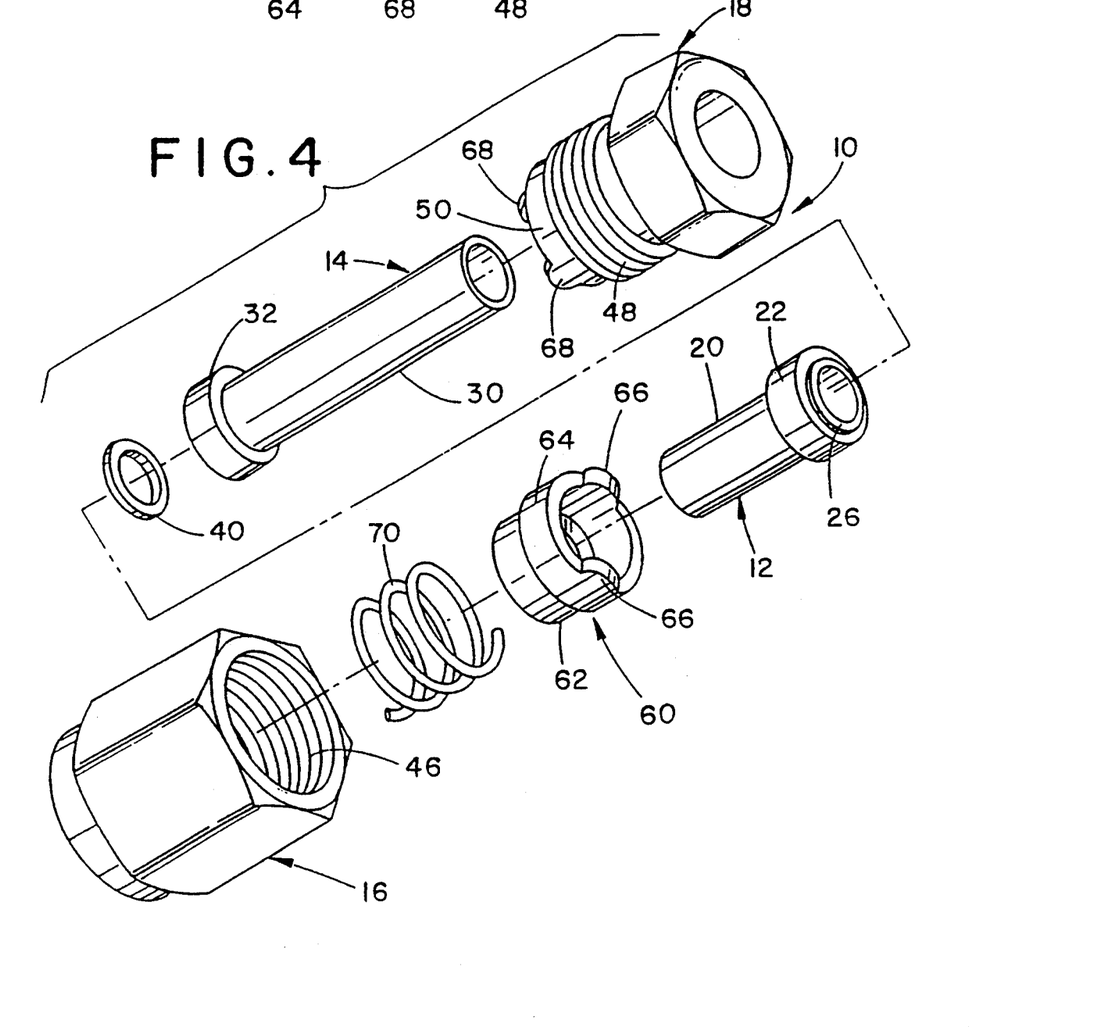
FIG. 4 is an exploded pictorial view showing the various components of the coupling assembly of FIG. 1.

Referring more particularly to the drawings wherein the showings are for the purpose of illustrating preferred embodiments of the invention only, and not for the purpose of limiting same, FIGS. 1-4 best show the preferred overall arrangement of a coupling assembly 10 formed in accordance with the preferred embodiment of the invention and generally comprising a first coupling component 12 and a second coupling component 14. The components 12, 14 are positioned in axial alignment and joined by first and second cooperating coupling nut members 16 and 18. As best shown in FIGS. 2 and 4, the first coupling component 12 preferably includes first and second cylindrical section 20 and 22 which are integrally formed in axially aligned relationship. Section 22 is a generally flange-like portion formed on the right hand end of section 20, as viewed in FIG. 2. As illustrated, the component 12 terminates in first and second end faces 24, 26 which are normally perpendicular to the longitudinally extending through passage 28. As can be appreciated, the end 24 is adapted to be connected to an associated flow line or the like. In this embodiment, the end 24 is intended for butt welded connection to the associated lines. It should, of course, be realized that many types of end fittings or connectors could be used for joining the coupling to the associated line. Likewise, the component 12 could, of course, be an integral part of the associated flow line or a separate element as illustrated.

The second coupling component 14 is illustrated as having a design and configuration substantially identical to the coupling component 12. It is, however, somewhat longer in that its first cylindrical body section 30 is of a length greater than the corresponding body section 20 of component 12. The second somewhat larger diameter body section 32 is, however, in all particulars, substantially identical to the body section 22 of component 12. As illustrated, a flow passage 34 extends axially throughout the length of the coupling member 14 and terminates in end faces 36 and 38 which are perpendicular to the central axis. End face 38 acts as a sealing face for cooperation with sealing face 26 of coupling component 12. In the embodiment illustrated, both of the end faces 26, 38, include circumferential protuberances extending axially from the end of their respective coupling component. These axially extending portions are arranged to sealingly engage with an associated flat metal washer member 40 positioned between the end faces as illustrated. It should, of course, be understood that in certain environments or under certain operating conditions, it may be desirable to dispense with the gasket member 40 and produce sealing in direct metal-to-metal, face-to-face contact between the end faces 26, 38. It should also be understood that the sealing faces could have other configurations eg. beads, flats with angle reliefs, etc.

As illustrated in FIG. 1, the coupling nuts 16, 18 each have a hex-shaped exterior to provide suitable tool receiving surfaces in the form of wrench flats which allow the necessary tightening forces to be applied to the coupling nuts. Referring more particularly to FIG. 2 and FIG. 4, it will be understood that the sealing end faces 26, 38, are driven into sealing engagement with gasket member 40 by coupling nuts 16, 18.

As shown, the first coupling nut 16 has a threaded, inwardly extending opening 46 adapted to receive the threaded male end portion 48 of the second nut member 18. The end portion 48 further includes an inwardly extending mouth or chamber defining section 50. As can be seen, the chamber section 50 is sized as to closely receive the exterior portion of the enlarged end 32 of the coupling component 14.

FIG. 4 shows the various components of the fitting assembly in their disassembled condition. FIG. 2 shows that the first nut member 16 and the second nut member 18 cooperate to define an enclosed chamber 52 which receives the enlarged ends of the coupling components 12 and 14. It should also be noted that each of the first and second nut members 16, 18 is provided with an axially extending recess 56, 58 respectively. These recesses are sized to receive the smaller diameter end portions 20, 30 of the components 12, 14.

As previously discussed, during make-up of prior art fittings of the type under consideration, application of torque to the coupling nuts tends to produce relative rotation of the coupling components 12 and 14. This, of course, results in twisting or relative rotary movement between the sealing end faces of the coupling components or between the sealing end faces and any associated sealing gasket. This relative movement can produce galling of the seal faces or the gaskets and results in loss of effectiveness of the seal. Moreover, the relative motion can produce particles which are detrimental to clean systems in certain industries. Even in those instances where a seal is achieved on original make-up, the relative movement can produce scoring or galling of a nature such that remake of the joint following disassembly is not possible without using a new gasket.

In the subject invention, an arrangement is provided which eliminates the possibility of this undesired torque transmission or relative movement between the coupling components. In particular, as best illustrated in FIGS. 2 and 4, the subject invention incorporates an anti-twist member 60 which is located between the first nut member 16 and the first coupling member 12 and which acts to assure that there is no relative movement between the end faces of the two coupling components 12 and 14. As best illustrated in FIG. 4, the anti-twist member 60 has a generally annular shape and includes a first body section 62 which comprises an inwardly extending flanged portion which is captured between the end wall of the nut member 16 and the left-hand side of the radially extending flanged or enlarged end portion 22 of the coupling component 12. The member 60 further includes an axially elongated body section 64 which has an inner diameter sized so as to closely receive the enlarged portion 22 of component 12, as well as components 14 and 40, in the manner shown. The outer end of the body section 64 is provided with a diametrically opposed pair of axially extending tabs or leg sections 66. The ends of the leg sections 66 preferably have a somewhat rounded configuration as best illustrated in FIGS. 3 and 4. Arranged to cooperate with the end section 66 are a pair of similar legs or tab members 68 which extend outwardly from the left-hand end of the second nut member 18 as viewed in FIGS. 2-4. The lengths of these opposed and cooperating leg members 66, 68 are such that when the coupling is in a partially made up condition and before sealing contact takes place between the end faces 26, 28 and the associated gasket 40, a radial driving connection has been achieved between the member 60 and the second nut member 18. That is, the leg member 66, 68 engage as best illustrated in FIG. 3 so that both the drive member and the second nut member 18 must move together if torque is transmitted from the first nut member 16 to either the member 60 or the second nut member 18. As is apparent, because the first and second coupling components 12, 14 are enclosed within the member 60 and the second nut member 18, torque will not be transmitted to them in a manner to produce relative rotation between their end faces.

Figure 5:
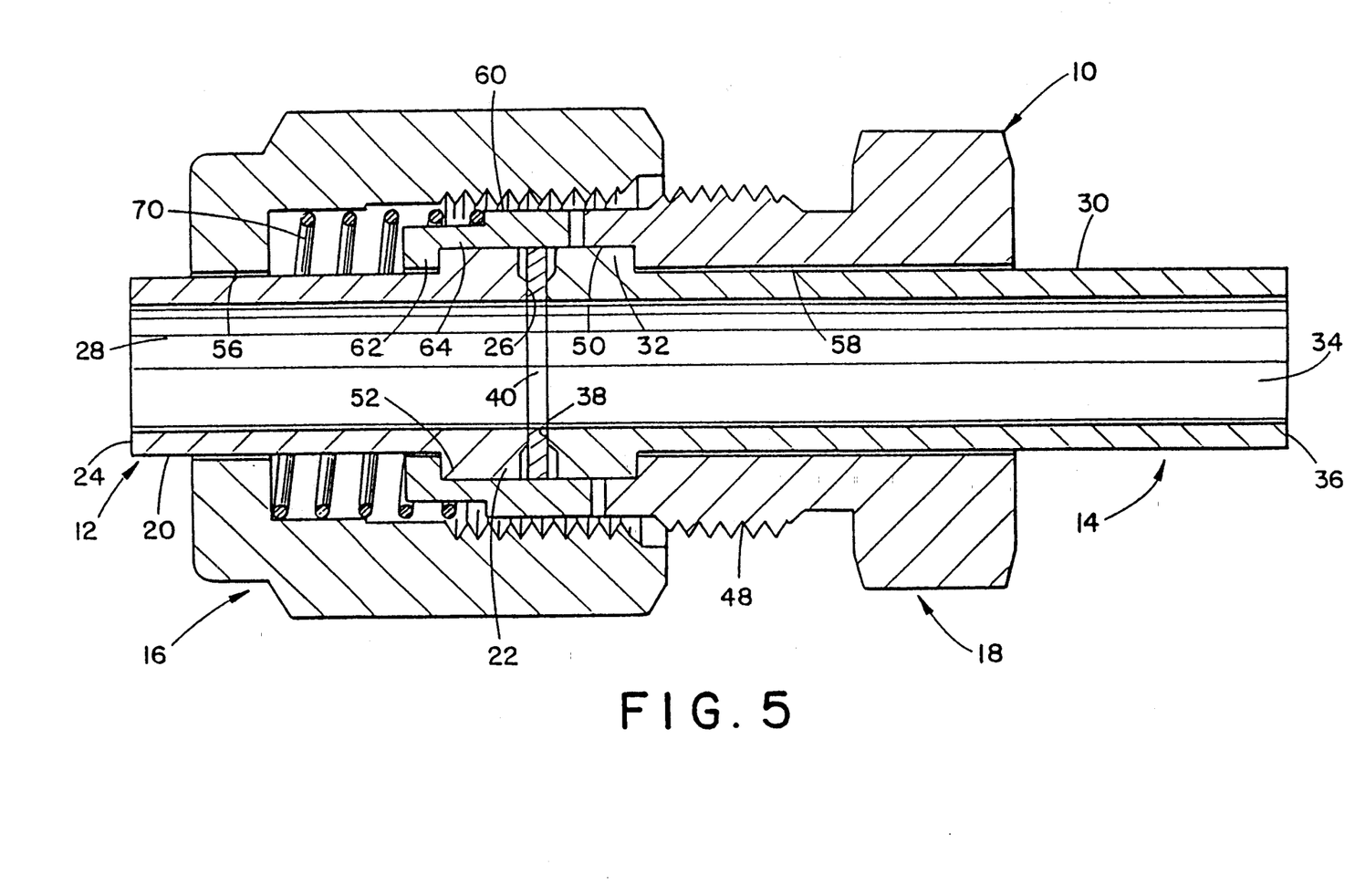
FIG. 5 is a cross-sectional view showing the components of FIG. 1 in a partially assembled condition.

In order to assure that the anti-twist member 60 and the second nut member 18 are positively engaged throughout all phases of coupling make-up, the assembly preferably includes a compression spring 70 which is arranged to act between the end wall of coupling nut 16 and the member 60. As best illustrated in FIG. 5, spring 70 maintains the member 60 and the associated coupling member 12 continually biased toward the open end of the first nut member 16. This assures that as the components are brought together as illustrated in FIG. 5, a drive connection is maintained between the member 60 and the second nut member 18 throughout all stages of the tightening operation.

It is contemplated that under certain conditions it might be desirable to maintain spring 70 in a compressed condition during assembly or disassembly. For this purpose a lateral opening, not shown, could be provided to allow insertion of a pin or the like to hold the spring compressed.

The use of the spring 70 also assures that the member 60 is visible to the assembler so that the relationship between the tab or leg sections 66, 68 (shown in FIG. 3) is clearly visible during the time that the respective components are being brought together. In addition, to assure that the leg sections will inter-engage in the desired manner and not inadvertently end up in an end-to-end relationship, the outer free ends of the leg members are preferably provided with a rounded configuration to reduce the possibility of the components remaining in such end-to-end engagement during fitting make-up. Alternatively, other end configurations such as points, inclined surfaces, and the like could be provided to accomplish this result.

Figure 9:
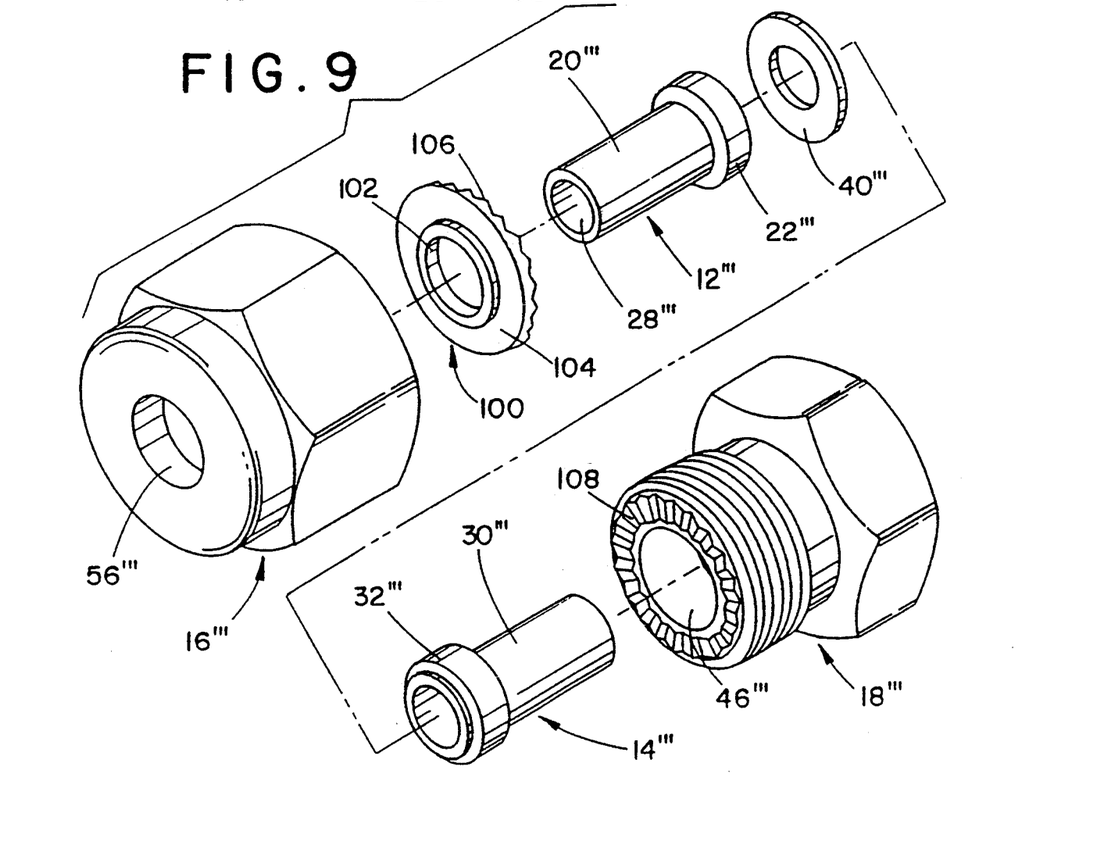
FIG. 9 is an exploded pictorial view of the coupling assembly of FIG. 8.
Figures 10, 11:
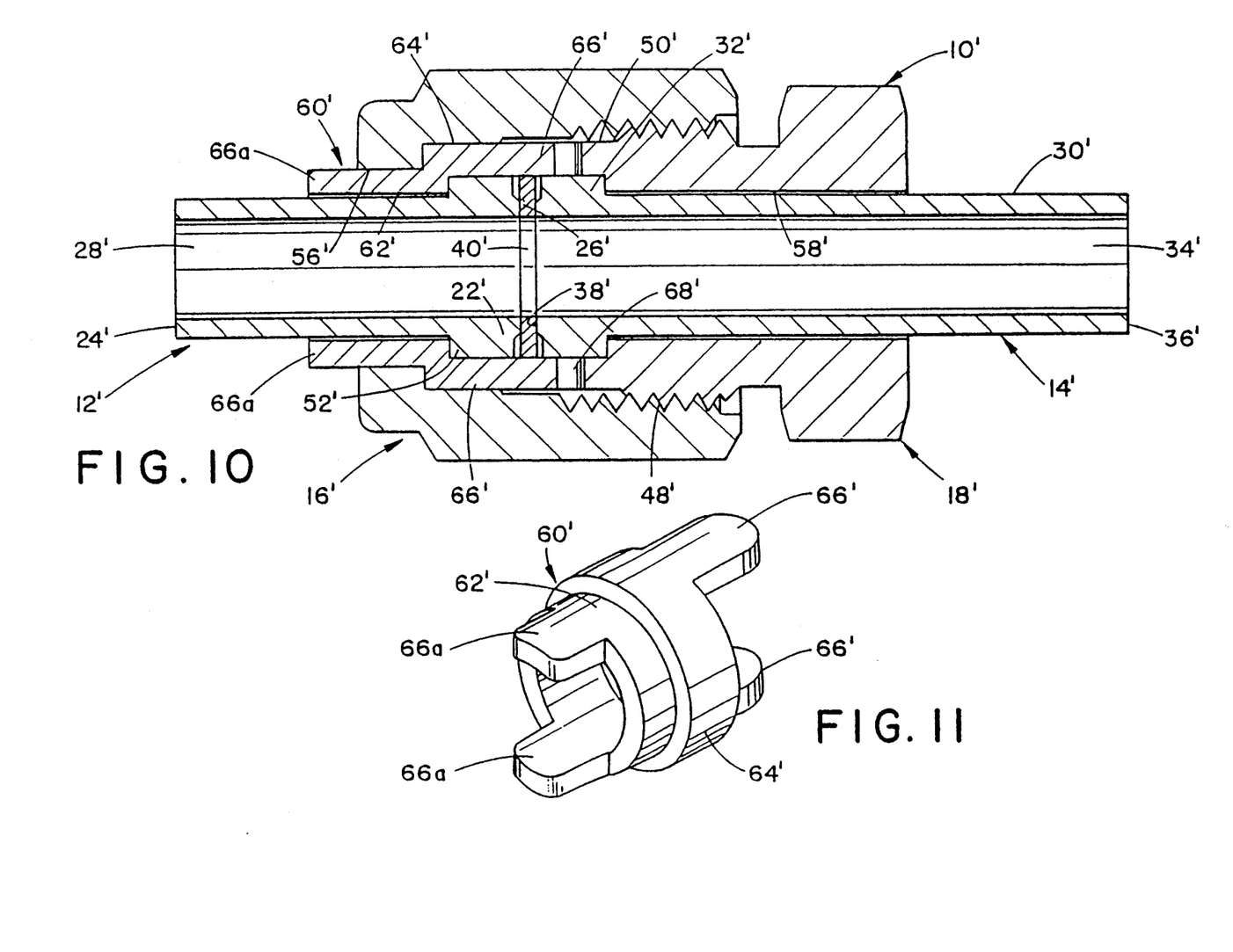
FIG. 10 is a longitudinal cross-sectional view of a modified form of the FIGS. 1-5 embodiment.
FIG. 11 is a pictorial view of the drive member used in the fitting of FIG. 10.

FIGS. 10 and 11 illustrate a modified form of the FIGS. 1-5 embodiment. In the FIGS. 10 and 11 showing, elements which correspond to those previously described with reference to the FIGS. 10 and 11 embodiment have been identified with the same reference numeral differentiated by the addition of a prime suffix. Unless otherwise noted the description of a FIG. 1-5 element is equally applicable to the correspondingly numbered FIG. 9 and 10 element.

In the FIGS. 9 and 10 form of the invention the spring 70 is eliminated and the anti-twist member 60' is modified to provide an externally visible indication of the position of tab or leg sections 66' and to provide means for manipulating the position of member 60' during fitting makeup. In this regard first body section 62' includes tab or leg sections 66a which extend therefrom in axial alignment with leg sections 66' as best seen in FIG. 4. The nut member 16' has opening 56' formed with a diameter to closely receive the body portion 62' and tabs 66a as shown. Consequently, during fitting make-up the drive member can be manually manipulated and positioned to provide the proper locking bias with tabs 68'. It is, of course, possible to forego the tabs 66a and length of body portion 62' to provide for manual manipulation. Suitable indicia corresponding to the location of leg sections 66' could be provided on the extended body portion 62'.

Figure 6:
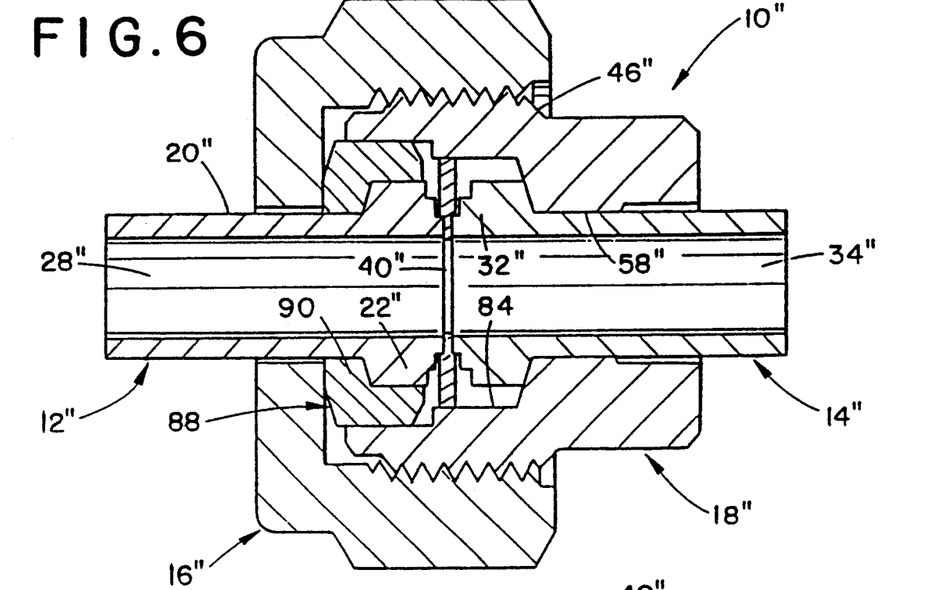
FIG. 6 is a longitudinal cross-sectional view similar to FIG. 2 but showing a second form of the invention.
Figure 7:
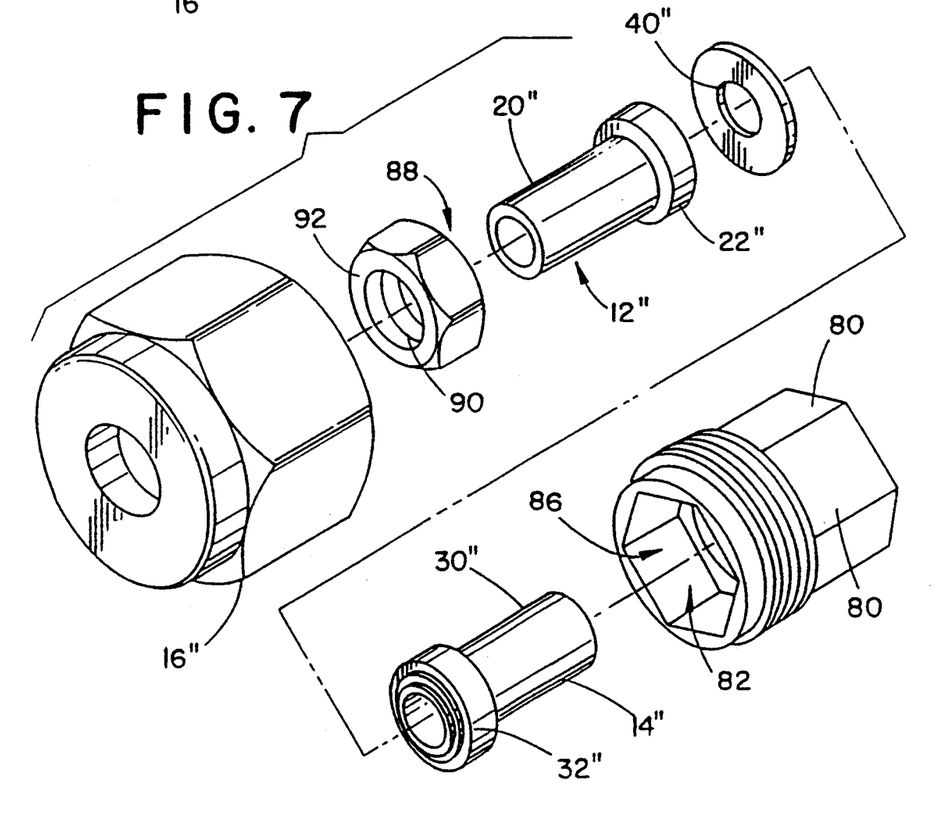
FIG. 7 is an exploded pictorial view showing the various coupling components of the FIG. 6 embodiment.

FIGS. 6 and 7 illustrate another embodiment of the invention. In this embodiment, the same reference numerals differentiated by a double prime suffix (") have been used to identify parts which generally correspond to those of the FIGS. 1-5 embodiment. The description of FIGS. 1-5 element is to be taken as equally applicable to a correspondingly identified FIGS. 6 and 7 element unless otherwise noted.

Referring more particularly to FIGS. 6 and 7, it will be noted that the embodiment shown therein comprises first and second coupling components 12" and 14" which are held in opposed face-to-face relationship relative to a gasket member 40" by the first and second nut members 16" and 18". The nut member 16" is generally the same as nut member 16 of the FIGS. 1-5 embodiment but can be somewhat shorter in overall length. Likewise, the second nut member 18" is generally similar to the nut member 18 but has a reduced diameter end provided with wrench flats 80. In addition, the left-hand end of the second nut member 18" has an inwardly extending opening 82 which is significantly different in shape and configuration from opening 50 of nut member 18 of the FIGS. 1-5 embodiment. More particularly, the opening 82 has a first generally circular inner end portion 84 which is sized and configured to freely receive the enlarged end 32" of the second coupling component 14". In addition, the diameter of section 84 is preferably only slightly larger than the outer diameter of the gasket 40" so that when assembled as shown in FIG. 6, the circumferential wall of opening 84 can act to center and guide the gasket 40".

Of particular importance to the subject invention, is the relationship between the outer end 86 of the opening 82 and a drive member 88. As illustrated in FIG. 7, the outer circumferential surface of the anti-twist member 88 has a non-circular shape which corresponds to the non-circular shape of the opening 86. In the subject embodiment, these components have cooperating hex shapes which provided axially extending surface portions for providing positive engagement between these two elements. Thus, when member 88 is received in opening 86 as shown in FIG. 6, there can be no relative rotational movement between these two components. The anti-twist member 88 can move axially within the chamber to allow suitable compressive sealing forces to be applied between the end faces of the first and second coupling components 12" and 14" relative to the gasket member 40". In this regard, it will be noted that drive member 88 has a radially inwardly extending flange or shoulder portion 90 which is sized so as to be closely received about the reduced diameter portion 20" and to engage suitably with the rear face of the enlarged flange portion 22". Additionally, the left-hand end face (as viewed in FIGS. 6 and 7) of the drive member 88 is preferably flat as shown at 92 and located at an angle so as to provide suitable engagement with the inner end of the opening 46" in the first nut member 16".

As can be seen from the foregoing, the embodiment of FIGS. 6 and 7 assures that during make-up no relative movement can take place between the anti-twist member 88 and the second nut member. Additionally, it is assured that there can be no relative movement between the end faces of the first and second coupling components 12" and 14" respectfully. Thus, scoring, abrading, or galling of either the end faces or the gasket member is avoided.

Figure 8:
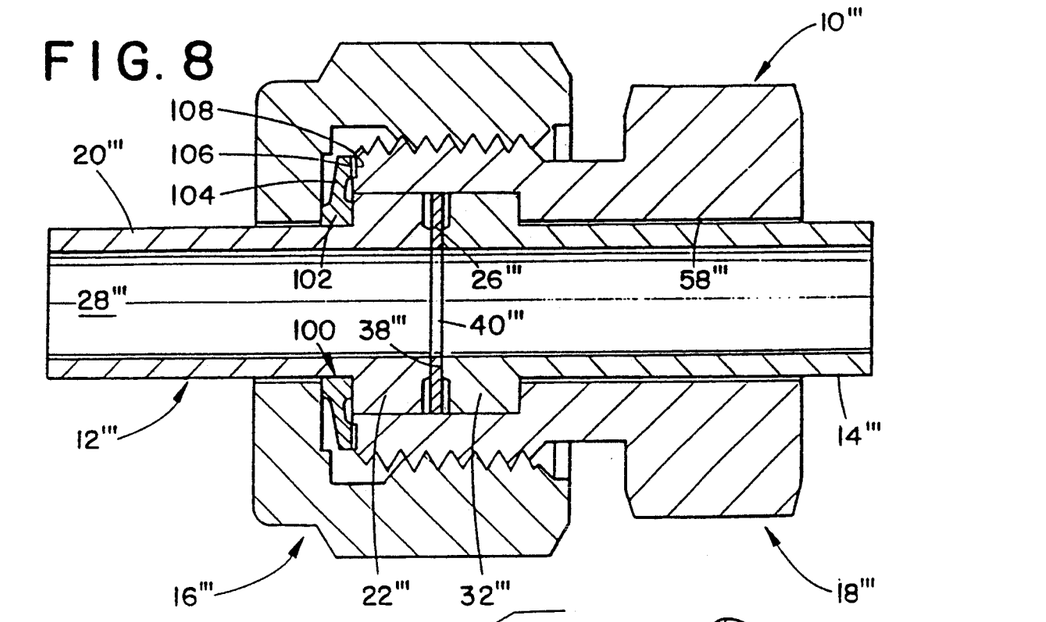
FIG. 8 is a longitudinal cross-sectional view similar to FIG. 2 but illustrating a third form of the invention.

FIGS. 8 and 9 illustrate a further embodiment of the subject invention. FIGS. 8 and 9 show elements which generally correspond to the previously described elements of FIGS. 1-5 and are identified with the same reference numeral differentiated by a three prime suffix ("'). It should be understood that the prior description for the corresponding element is to be taken as equally applicable to the FIGS. 8 and 9 embodiment unless otherwise noted.

The coupling assembly of FIGS. 8 and 9 generally comprises the same main components as previously described with reference to the embodiments of FIGS. 1-7. More particularly, the coupling assembly 10''' comprises cooperating first and second coupling components 12''' and 14''' which are maintained in aligned engaged relationship on opposite sides of a gasket member 40''' by a pair of cooperating first and second nut members 16''' and 18'''. In this embodiment, the inwardly extending mouth 46''' of the nut member 18''' is circular throughout its depth and of a diameter so as to closely receive the enlarged end portions 22''' and 32''' of the coupling components 12''' and 14'''. In addition, as best seen in FIG. 8, the depth of the opening 46''' is such as to completely receive the respective end portions 22''' and 32''' in the manner shown.

In the FIGS. 8 and 9 embodiment, the drive member 100 comprises an annular central body section 102 which is sized so as to be closely received about the outer periphery of section 20''' of first coupling component 12'''. The central body section 102 is rigid and has opposed end faces which are shaped and arranged so as to be capable of conducting axial forces from the nut member 16''' to the flange 22''' of the coupling component 12'''. In order to prevent relative rotary motion between the anti-twist member 100 and the second nut member 18''', there are cooperating axially extending portions engaged between the drive member and the nut member 18'''. As best illustrated in FIG. 9, the engaging means comprise a radially extending flange or web section 104 carried on the central annular body 102. The right-hand face of the flange or web section 104 (as viewed in FIG. 9) is provided with a circumferentially spaced and radially extending series of teeth 106. Teeth 106 are arranged to positively engage with the correspondingly shaped end face teeth 108 formed on the left-hand end of nut member 18'''. As illustrated in FIG. 8, engagement takes place between the cooperating teeth 106 and 108 during the final make-up of the coupling assembly. Because of this engagement, there can be no relative movement between the anti-twist member 100 and the nut member 18''' Relative axial movement between the drive member 100 and the nut member 18''' is permitted during this final make-up by an axial flexing of the flange or peripheral web section 104. This is illustrated in the bottom half of FIG. 8. That is, the web 104 can flex and, in effect, tilt relative to the annular body section 102.

Because of the relationship and the positive interengagement between the anti-twist member and the second nut member 18''', it is not possible to apply torque from the first nut member 16''' to the coupling components 12''' or 14'''. Moreover, it is apparent there can be no relative movement produced between the opposed end faces of the coupling components by virtue of the relative tightening of the nut member 16''' and 18'''.

Figures 12, 13:
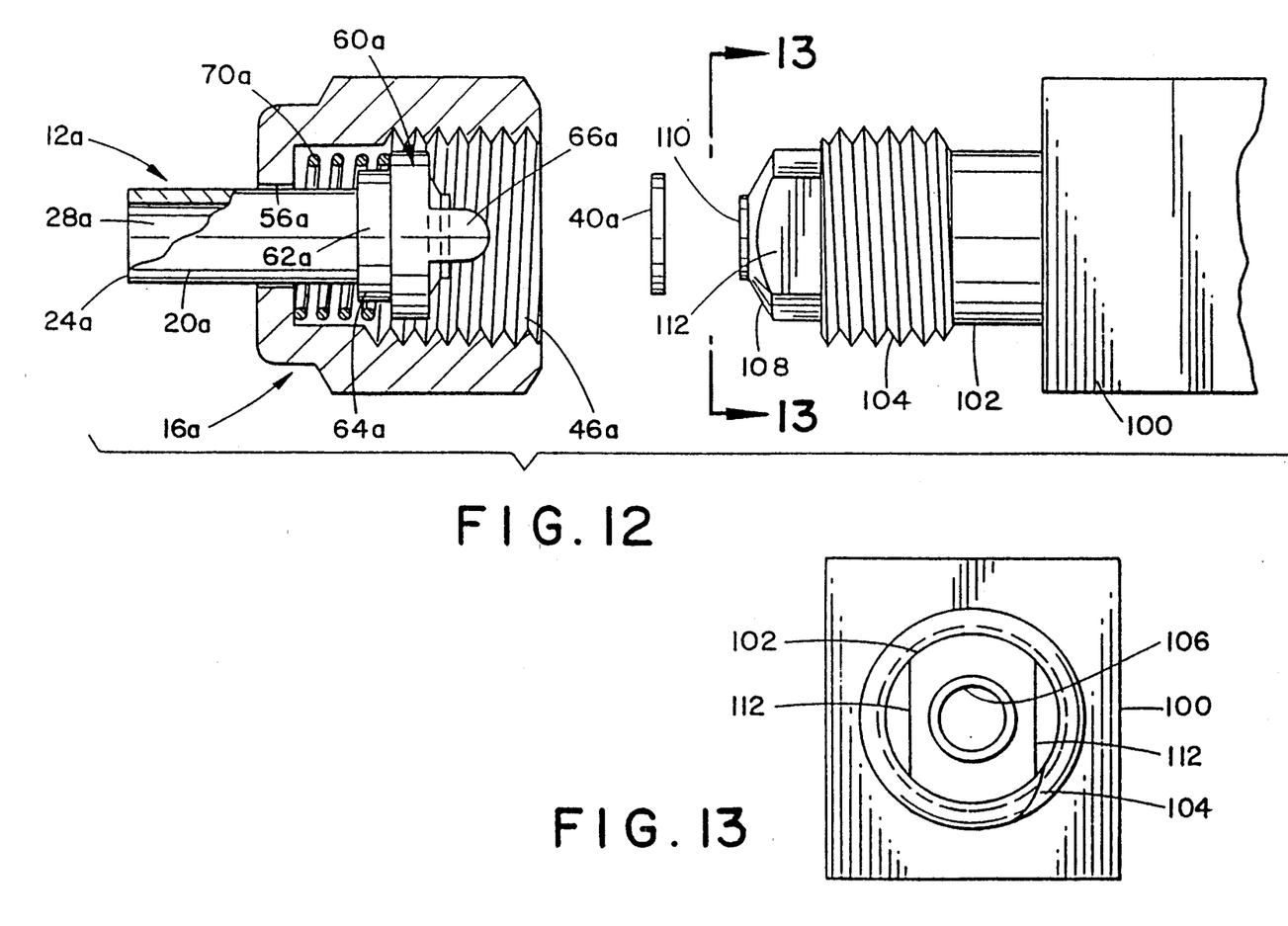

FIG. 12 is a side elevational view, partially in section, illustrating how the FIG. 1-5 arrangement can be used on a threaded male end connection such as may be integrally machined on a valve body to provide an inlet or outlet connection. As illustrated, the valve body 100 has a cylindrical male end 102 formed thereon with integral threads 104 and a central flow passage 106. The outer end face 108 of end 102 is the sealing face and includes a protuberance 110 for engaging the sealing face of the associated coupling component or the sealing gasket if one is used.

The coupling components associated with the male end connection are illustrated as being basically the same as those described with reference to the FIGS. 1-5 embodiment. Accordingly the components have been identified with the same reference numeral differentiated by addition of an "a" suffix. The description of the corresponding FIGS. 1-5 element is to be taken as equally applicable to the FIGS. 12 and 13 embodiment unless otherwise noted.

In the FIGS. 12 and 13 embodiment, positive engagement between the annular anti-twist member 60a and the male end 102 is achieved by providing laterally positioned flats 112 on the outer free end of the male end 102. The flats 112 are spaced and positioned such that tabs 66a are closely received thereover as the fitting is assembled. Consequently, during the final tightening of nut 16a there is no relative rotation between member 60a and male end 102. Therefore, there is no torque transmitted to coupling member 12a and there is no relative rotation produced between the sealing end faces and the gasket 40a.

It should be appreciated that the other embodiments of the invention could be adapted for use with a male end fitting in much the same manner as the FIGS. 12 and 13 embodiment.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A tube coupling comprising:

first and second coupling components respectively having first and second radially extending flanges and flow passages terminating in openings formed in transversely extending end faces, the end faces being provided with sealing means in axial alignment therewith;

said first and second coupling components being positioned with said end faces in aligned face-to-face relationship;

first and second nut members associated respectively with said first and second coupling components and cooperating to define a chamber about the end faces of said first and second coupling components, said first and second nut members being joined by threaded portions arranged such that rotation of said first nut member in a first direction relative to said second nut member produces movement of said first nut member axially toward said second nut member; and, an anti-twist member located between said first nut member and said first coupling component including means for conducting axial forces from said first nut member to said first flange, said anti-twist member and said second nut member including axially extending portions including means for preventing relative rotation therebetween during rotation of said first nut member in said first direction.

2. The coupling as defined in claim 1 wherein said axially extending portions include recesses formed in at least one of said second nut member and said anti-twist member.

3. The coupling as defined in claim 2 wherein said recess are formed through the exterior of said second nut member.

4. The coupling as defined in claim 1 wherein said anti-twist member has an annular body and said axially extending portions comprise separate leg elements extending axially from said annular body.

5. The coupling as defined in claim 1 wherein said anti-twist member has an annular body and said axially extending portions comprise ribs formed on the exterior of said annular body.

6. The coupling as defined in claim 1 wherein said anti-twist member includes an annular body located between said first nut member and said first coupling component.

7. The coupling as defined in claim 6 wherein said axially extending portions are located radially outwardly of said annular body.

8. The coupling as defined in claim 7 wherein said axially extending portions are carried on resilient means extending radially from said annular body.

9. The coupling as defined in claim 6 wherein said annular body is positioned between said first flange and said first nut member.

10. A tube coupling comprising:

first and second coupling components respectively having first and second radially extending flanges and flow passages terminating in openings formed in transversely extending end faces, the end faces being provided with sealing means in axial alignment therewith;

said first and second coupling components being positioned with said end faces in aligned face-to-face relationship;

threaded nut means associated with said first and second coupling components and including a first nut member and a cooperating threaded portion arranged such that rotation of said first nut member in a first direction produces compressive forces to compress said first coupling component toward said second coupling component; and, an annular member located between said first nut means and said first coupling component including means for conducting said compressive forces from said first nut member to said first and second flanges, said annular member including axially extending portions engaged with said cooperating threaded portion including means for preventing relative rotation between said annular member and said cooperating threaded portion during rotation of said first nut member in said first direction.

11. The coupling as defined in claim 10 wherein said axially extending portions include recesses formed in at least one of said drive member and said cooperating threaded portion.

12. The coupling as defined in claim 4 wherein said cooperating threaded portion comprises a second nut member.

13. The coupling as defined in claim 12 wherein said annular member has an annular body and said axially extending portions comprise separate leg elements extending axially from said annular body.

14. The coupling as defined in claim 11 wherein said annular member has an annular body and said axially extending portions comprise ribs formed on the exterior of said annular body.

15. The coupling as defined in claim 14 wherein said annular member includes an annular body located between said first nut member and said first coupling member.

16. The coupling as defined in claim 15 wherein said axially extending portions are located radially outwardly of said annular body.

17. The coupling as defined in claim 16 wherein said axially extending portions are carried on resilient means extending radially from said annular body.

18. The coupling as defined in claim 15 wherein said annular body is positioned between said first flange and said first nut member.

19. A coupling for interconnecting two tubular parts having opposed ends and shoulders spaced from said ends via which force is applicable to urge said opposed ends toward one another, comprising:

(a) two tubular members defining a longitudinal axis and adapted to coaxially receive the respective parts and to transmit axial force thereto, via said shoulders, (b) a torque isolator assembly including a metallic annulus received against one of said shoulders on one of said parts, and generally longitudinal projection means positioned on said one member to block rotation of said annulus relative to said one member, and about said axis, (c) cooperating screw thread means on said members adapted to interfit when said members are relatively rotated to make up the coupling, the one member received into the other of said members, (d) and a pusher surface on the other of said members engageable with said annulus to transmit axial force via said annulus to said one shoulder, when the coupling is made up, (e) and wherein said tubular parts have end flanges with annular protrusions that present convex surfaces, with a metallic annular seal between and engaged by said surfaces in response to coupling make-up (f) said one member having a counterbore closely receiving the periphery of said flanges and said metallic seal and terminating in spaced relation to sad metallic annulus, said metallic seal axially spaced from both said shoulders.

20. The coupling of claim 19 wherein said annulus has peripheral flat means engaged by said projection means to affect the blocking of said rotation of said annulus.

21. The coupling of claim 20 wherein said flat means extends radially outwardly, and said projection means has cooperating flat means facing radially inwardly for engagement with the flat means on the annulus.

22. The coupling of claim 21 wherein said flat means on the annulus includes at least two flats, and said cooperating flat means on the projection means includes at least two cooperating flats respectively engageable with the flats on the annulus.

23. The coupling of claim 22 wherein the annulus comprises a flat plate having a rim, and two diametrically opposed flats at said rim.

24. The coupling of claim 23 wherein the projection means comprises two projections extending generally parallel to said axis, at opposite sides of that axis, the annulus plate having sufficient thickness to maintain the terminal ends of said projections spaced from a plane defined by the pusher surface.

25. The coupling of claim 19 wherein said projection means extends longitudinally beyond one end of said one member, directionally toward said pusher surface of the other member.

26. The coupling of claim 25 wherein said projection means is located radially outwardly of said pusher surface.

27. The coupling of claim 26 wherein said projection means extends along the longitudinal axis beyond the thread means on said one member.

28. The coupling of claim 19, wherein said annulus comprises a plate which is effectively rotatably locked to said one member by interfit with said projection means whereby the plate may be displaced only axially toward said one shoulder during make-up of the coupling, the other shoulder on a second of said tubular parts then being engaged by said one tubular member.

29. A coupling for interconnecting two tubular parts having opposed ends and shoulder spaced from said ends via which force is applicable to urge said opposed ends toward one another, comprising:

(a) two tubular members defining a longitudinal axis and adapted to coaxially receive the respective parts and to transmit axial force thereto, via said shoulders, (b) a torque isolator assembly including a metallic annulus receive against one of said shoulders on one of said parts, and generally longitudinal projection means positioned on said one member to block rotation of said annulus relative to said one member, and about said axis, (c) cooperating screw thread means on said members adapted to interfit when said members are relatively rotated to make up the coupling, the one member received into the other of said members, (d) and a pusher surface on the other of said members engageable with said annulus to transmit axial force via said annulus to said one shoulder, when the coupling is made up (e) and wherein said tubular parts have end flanges with annular protrusions that present convex surfaces, (f) said one member having a counterbore closely receiving the periphery of said flanges and terminating in spaced relation to said metallic annulus.

* * * * *